(12) United States Patent
Min

(10) Patent No.: US 6,734,717 B2
(45) Date of Patent: May 11, 2004

(54) CHARGE PUMP CIRCUIT

(75) Inventor: Kyeong Sik Min, Cheongju-Shi (KR)

(73) Assignee: Hynix Semiconductor Inc., Kyungki-Do (KR)

( * ) Notice: Subject to any disclaimer, the term of this patent is extended or adjusted under 35 U.S.C. 154(b) by 0 days.

(21) Appl. No.: 10/286,962

(22) Filed: Nov. 4, 2002

(65) Prior Publication Data

US 2003/0122611 A1 Jul. 3, 2003

(30) Foreign Application Priority Data

Dec. 29, 2001 (KR) .................................. 2001-0087974

(51) Int. Cl.$^7$ ................................................ G05F 3/16
(52) U.S. Cl. ........................ 327/536; 327/537; 363/60
(58) Field of Search ................................. 327/535, 536, 327/537; 363/59, 60; 365/189.09, 226

(56) References Cited

U.S. PATENT DOCUMENTS

| | | | |
|---|---|---|---|
| 5,394,374 A | 2/1995 | Ishimura et al. | 365/230.06 |
| 5,687,128 A | 11/1997 | Lee et al. | 365/226 |
| 5,767,729 A | 6/1998 | Song | 327/536 |
| 5,841,705 A | 11/1998 | Hamamoto et al. | 365/189.09 |
| 5,841,725 A | 11/1998 | Kang et al. | 365/226 |
| 5,867,421 A | 2/1999 | Ho et al. | 365/149 |
| 6,101,150 A | 8/2000 | Roohparvar | 365/230.06 |
| 6,107,864 A * | 8/2000 | Fukushima et al. | 327/536 |
| 6,169,519 B1 | 1/2001 | Holecek et al. | 342/442 |
| 6,177,828 B1 | 1/2001 | Kang et al. | 327/536 |
| 6,208,196 B1 * | 3/2001 | St. Pierre | 327/536 |
| 6,215,708 B1 | 4/2001 | Lien et al. | 365/189.09 |
| 6,429,723 B1 * | 8/2002 | Hastings | 327/536 |
| 2002/0101277 A1 * | 8/2002 | Choi | 327/536 |

FOREIGN PATENT DOCUMENTS

| | | | |
|---|---|---|---|
| JP | 6-203559 | 7/1994 | G11C/11/407 |
| JP | 8-249879 | 9/1996 | G11C/11/407 |
| JP | 10-208489 | 8/1998 | G11C/16/06 |
| JP | 10-247386 | 9/1998 | G11C/11/407 |
| JP | 10-285911 | 10/1998 | H02M/3/07 |
| JP | 11-26701 | 1/1999 | H01L/27/04 |
| JP | 11-297957 | 10/1999 | H01L/27/108 |
| JP | 2000-353392 | 12/2000 | G11C/16/06 |
| JP | 2001-35161 | 2/2001 | G11C/11/407 |

* cited by examiner

Primary Examiner—Timothy P. Callahan
Assistant Examiner—Terry L. Englund
(74) Attorney, Agent, or Firm—Morgan, Lewis & Bockius LLP

(57) ABSTRACT

A charge pump circuit includes a first switch for connecting an input terminal to a first pumping node, a first pumping capacitor for boosting up a voltage level of the first pumping node in response to a first control signal, a second switch for connecting the first pumping node to an output terminal, a third switch for connecting the input terminal to a second pumping node, a second pumping capacitor for boosting up a voltage level of the second pumping node in response to a second control signal, and a fourth switch for connecting the second pumping node to the output terminal. The charge pump circuit decreases a loss of an output voltage and prevents malfunctions in MOS devices by preventing damages of gate oxides of the MOS devices due to excessively high voltage differences.

15 Claims, 3 Drawing Sheets

CHARGE PUMP CIRCUIT

The present invention claims the benefit of Korean Patent Application No. 2001-87974, filed in Korea on Dec. 29, 2001, which is hereby incorporated by reference.

BACKGROUND OF INVENTION

1. Field of the Invention

The present invention relates to charge pump circuits in semiconductor integrated circuits, and more specifically, to charge pump circuits with minimal output voltage losses and less stress on gate oxides of the MOS devices in the circuits.

2. Discussion of the Related Art

It is now usual to employ charge pump circuits in non-volatile memories, for the purpose of preparing high voltages to conduct internal operations such as programming and erasing thereof. The charge pump circuits generate operational voltages higher than a power supply voltage provided from the external into the nonvolatile memory chips, by which the operational voltages induce charge tunneling effects through thin gate oxides in programming and erasing cell data.

Since the switched capacitor type of application in analog circuits, it has been mostly used the way of charge pump that was proposed by J. Dickson in IEEE Journal of Solid-State Circuits published on June 1976 (Vol. 11, pp. 374–378), entitled "On-chip high voltage generation in NMOS integrated circuits using an improved voltage multiplier technique."

The Dickson's architecture is a construction of diode-coupled switches and pumping capacitors responding to two-phase clock signals. But, it has been well known that pumping circuits based on the Dickson's architecture fails to provide sufficient pumping when a power supply voltage becomes low, in which their output gains for boosting voltages decrease to an unusable condition.

The circuit shown in FIG. 1 is one of trials to overcome the problems of the circuits based on the Dickson's architecture, disclosed in IEEE Journal of Solid-State Circuits on April 1998 (Vol. 33, pp. 592–597) by J. T. Wu and K. L. Chang), entitled "MOS charge pumps for low-voltage operation."

Referring to FIG. 1, a first charge transfer switch T11 is connected between an input terminal and a node Q12. The first charge transfer switch T11 responds to a power supply voltage Vcc from the input terminal and a voltage at a node Q11. A first NMOS transistor N11 is connected between the power supply voltage Vcc and the node Q11, and responds to a voltage at the node Q12. A first PMOS transistor P11 is connected between the node Q11 and a node Q14, and responds to the voltage at the node Q12. The bulk terminal of the first PMOS transistor P11 is connected to the node Q14. A first capacitor C11 is connected between a clock terminal and the node Q12, and responds to a clock signal φ from the clock terminal to charge the node Q12.

A second charge transfer switch T12 is connected between the nodes Q12 and Q14, and responds to the voltage at the node Q12 and a node Q13. A second NMOS transistor N12 is connected between the nodes Q12 and Q13, and responds to a voltage at the node Q14. A second PMOS transistor P12 is connected between the node Q13 and a node Q16, and responds to the voltage at the node Q14. The bulk terminal of the second PMOS transistor P12 is connected to a node Q16. Also, a second capacitor C12 is connected between a clock bar terminal and the node Q14, and responds to a clock bar signal φB from the clock bar terminal to charge the node Q14.

A third charge transfer switch T13 is connected between the nodes Q14 and Q16, and responds to a voltage at the node Q14 and a node Q15. A third NMOS transistor N13 is connected between the nodes Q14 and Q15, and responds to a voltage at the node Q16. A third PMOS transistor P13 is connected between the node Q15 and a node Q17, and responds to the voltage at the node Q16. The bulk terminal of the third PMOS transistor P13 is connected to a node Q17. Also, a third capacitor C13 is connected to the clock terminal and the node Q16, and responds to the clock signal φ from the clock terminal to charge the node Q16.

A fourth charge transfer switch T14 is connected to the node Q16 and an output terminal Vout, and responds to the voltages at nodes Q16 and Q17. A capacitor C14 is coupled between the node Q17 and the clock bar terminal, and responds to a clock bar signal φB from the clock bar terminal. A capacitor C15 is coupled between the output terminal Vout and a ground voltage terminal Vss.

In the operation of the charge pump circuit shown in FIG. 1, when the clock signal φ is LOW and the clock bar signal φB is HIGH, the voltage at the node Q12 is set to be a voltage lower than Vcc, and the voltages at the nodes Q14 and Q16 are set to Vcc+2ΔV (ΔV is a voltage increment). Meanwhile, the node Q17 maintains a voltage of ΔV. Since the voltage at the node Q12 is lower than Vcc and the voltage at the node Q14 is Vcc+2ΔV, the PMOS transistor P11 is turned ON and the voltage at the node Q11 is set at Vcc+2ΔV. In the meantime, as the voltage at the node Q12 is held to be the voltage lower than Vcc, the NMOS transistor N11 is turned OFF. Since the voltage at the node Q11 is Vcc+2ΔV, the charge transfer switch T11 is turned ON. Thus, the node Q12 maintains the voltage lower than Vcc.

To the contrary, when the clock signal φ is HIGH and the clock bar signal φB is LOW, the voltages at the nodes Q12 and Q14 are set to Vcc+ΔV and the node Q16 rises up to Vcc+3ΔV. While the voltage at the node Q12 turns the NMOS transistor N11 ON, the charge transfer switch T11 is turned OFF because the voltage of the node Q12 (i.e., Vcc+ΔV) is higher than Vcc. At this time, the PMOS transistor P11 is turned OFF. In the meantime, as the voltages at the nodes Q14 and Q16 are held at Vcc+ΔV and Vcc+3ΔV, respectively, the PMOS transistor P12 is turned ON to make the voltage of the node Q13 at Vcc+3ΔV. And, the NMOS transistor N12 is turned OFF because the voltages at the nodes, Q12 and Q14, are identical each other. The voltage at the node Q13 being Vcc+3ΔV turns the charge transfer switch T12 ON. Thus, the node Q14 maintains Vcc+ΔV.

Therefore, the nodes, Q12 and Q16, are established respectively on Vcc+ΔV and Vcc+3ΔV by means of pumping in response to the clock signal φ being HIGH, while the node Q14 is pumped up to Vcc+2ΔV in response to the clock bar signal φB being HIGH. That is, the clock signal φ and the clock bar signal φB, alternately oscillate to maintain the output voltage at Vout at Vcc+3ΔV.

As described above, in the conventional charge pump circuit, a front charge transfer switch responds to a high voltage generated from subsequent charge transfer switches. Therefore, in contrast to the circuits based on the Dickson's architecture, the less is the propagation loss for a pumping voltage, the better is the pumping efficiency of the circuit.

However, the conventional charge pump circuit shown in FIG. 1 inevitably faces problems of a high voltage stress at gate oxide films of the MOS devices forming the charge transfer switches because the gate electrodes of the front charge transfer switches are driven by the high voltages generated from subsequent charge transfer switches. For instance, the charge transfer switch T12 is turned on by the voltage of Vcc+3ΔV at the node Q16, and thereby transfers the voltage of Vcc+ΔV at the node Q12 to the node Q14. At this time, a high voltage difference of 2ΔV is between the nodes Q16 and Q12 and applied to gate oxide layers of the MOS devices of the charge transfer switch T12. Such a high voltage stress is disadvantageous to the reliability of the MOS devices.

Furthermore, as the MOS transistor acting T14 as a transmission switch for the output terminal Vout is formed in a diode circuit, there is a voltage drop when a voltage level at the node Q16 is transmitted to the output voltage Vout. Such a voltage drop is also disadvantageous to the reliability of the MOS devices.

SUMMARY OF THE INVENTION

Accordingly, the present invention is directed to a charge pump circuit that substantially obviates one or more of the problems due to limitations and disadvantages of the related art.

An object of the present invention is to provide a charge pump circuit capable of driving a higher pumping voltage without degrading the reliability of MOS devices.

Another object of the present invention is to provide a charge pump circuit enhancing the efficiency of a voltage pumping operation, increasing an output voltage gain.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the charge pump circuit includes a first switch for selectively connecting an input terminal to a second pumping node; a second switch for selectively connecting the input terminal to a first pumping node; a first pumping capacitor for boosting a signal at the second pumping node in response to a first clock signal; a second pumping capacitor for boosting a signal at the first pumping node in response to a second clock signal; a third switch for selectively connecting the second pumping node to an output terminal; a fourth switch for selectively connecting the first pumping node to the output terminal; and a fifth switch for regulating the third switch in response to a voltage level of the signal at the first pumping node.

In another aspect, the charge pump circuit includes a first NMOS transistor having a drain terminal connected to an input terminal, a gate terminal connected to a first pumping node and a source terminal connected to a second pumping node; a second NMOS transistor having a drain terminal connected to the input terminal, a gate terminal connected to the second pumping node and a source terminal connected to the first pumping node; a first PMOS transistor having a source terminal connected to the second pumping node, a gate terminal connected to the first pumping node and a drain terminal connected to an output terminal; a second PMOS transistor having a source terminal connected to the first pumping node, a gate terminal connected to the second pumping node and a drain terminal connected to the output terminal; a third PMOS transistor having a source terminal connected to the second pumping node, a gate terminal connected to the first pumping node and a drain terminal connected to a bulk terminal of the first PMOS transistor; a fourth PMOS transistor having a source terminal connected to the first pumping node, a gate terminal connected to the second pumping node and a drain terminal connected to a bulk terminal of the second PMOS transistor; a first pumping capacitor for boosting a signal at the second pumping node in response to a first clock signal; and a second pumping capacitor for boosting a signal at the first pumping node in response to a second clock signal, wherein the first and second clock signals being complementary in phase each other, and wherein the second NMOS transistor, and the second and fourth PMOS transistors are driven in response to a voltage level of the first pumping node while the first NMOS transistor, and the first and third PMOS transistors are driven in response to a voltage level of the first pumping node.

In yet another aspect, the charge pump circuit includes a first NMOS transistor having a drain terminal connected to an input terminal, a gate terminal connected to a first pumping node and a source terminal connected to a second pumping node; a second NMOS transistor having a drain terminal connected to the input terminal, a gate terminal connected to the second pumping node and a source terminal connected to the first pumping node; a third NMOS transistor having a source terminal connected to a bulk terminal of the first NMOS transistor, a gate terminal connected to the first pumping node and a drain terminal connected to the second pumping node; a fourth NMOS transistor having a source terminal connected to a bulk terminal of the second NMOS transistor, a gate terminal connected to the second pumping node and a drain terminal connected to the first pumping node; a first PMOS transistor having a source terminal connected to the second pumping node, a gate terminal connected to the first pumping node and a drain terminal connected to an output terminal; a second PMOS transistor having a source terminal connected to the first pumping node, a gate terminal connected to the second pumping node and a drain terminal connected to the output terminal; a third PMOS transistor having a source terminal connected to the second pumping node, a gate terminal connected to the first pumping node and a drain terminal connected to a bulk terminal of the first PMOS transistor; a fourth PMOS transistor having a source terminal connected to the first pumping node, a gate terminal connected to the second pumping node and a drain terminal connected to a bulk terminal of the second PMOS transistor; a first pumping capacitor for boosting a signal at the second pumping node in response to a first clock signal; and a second pumping capacitor for boosting a signal at the first pumping node in response to a second clock signal, wherein the first and second clock signals being complementary in phase each other, and wherein the second and fourth NMOS transistors, and the second and fourth PMOS transistors are driven in response to a voltage level of the second pumping node while the first and third NMOS transistors, and the first and third PMOS transistors are driven in response to a voltage level of the first pumping node.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 2:
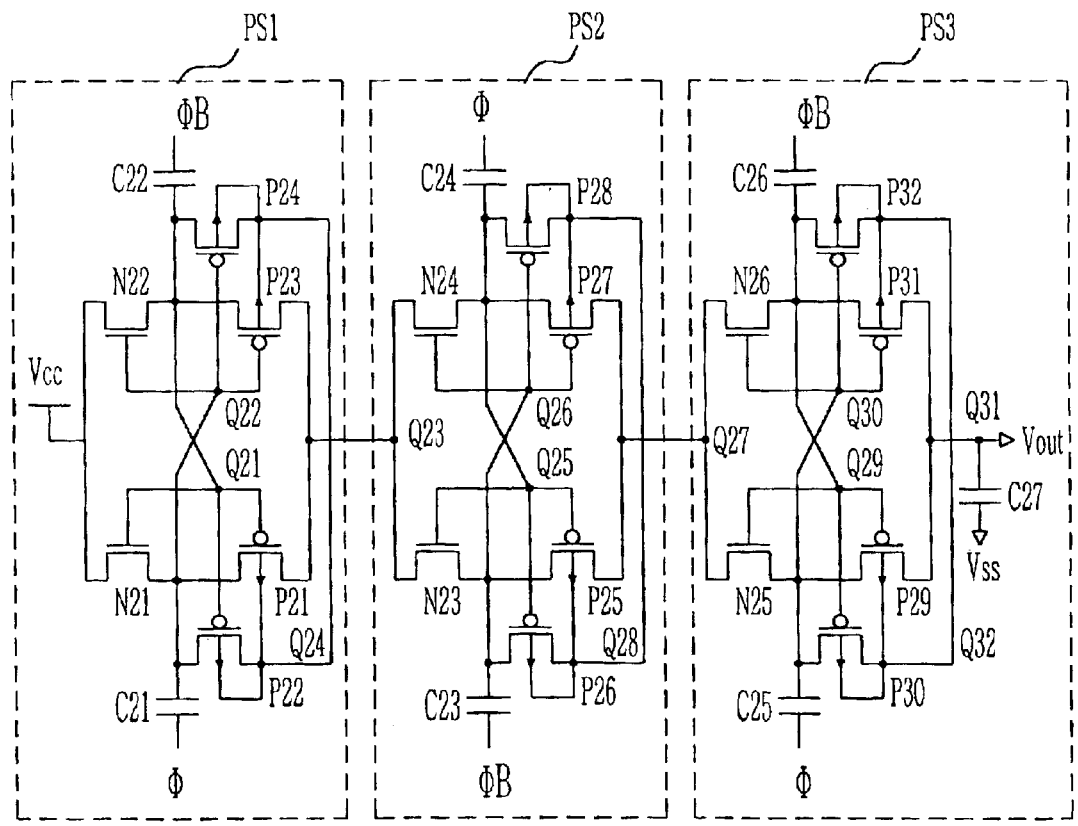
FIG. 2 is a circuit diagram of a charge pump circuit according to an embodiment of the invention.

FIG. 2 shows a structure of a charge pump circuit with three pumping stages (first pumping stage PS1, second pumping stage PS2, and third pumping stage PS3).

Referring to FIG. 2, in the first pumping stage PS1, between an input terminal supplying a power supply voltage Vcc and a node Q22 is connected a first NMOS transistor N21 whose gate is coupled to a node Q21. Between the node Q21 and a node Q23 is connected to a first PMOS transistor P21 whose gate and bulk are coupled to the node Q21 and a node Q24 respectively. A first capacitor C21 is coupled between a first clock terminal supplying a clock signal φ and the node Q22. Between the nodes Q22 and Q24 is connected a second PMOS transistor P22 whose gate and bulk are coupled to the nodes Q21 and Q24 respectively.

Between Vcc and the node Q21 is connected a second NMOS transistor N22 whose gate is coupled to the node Q22. Between the node Q21 and a node Q23 is connected a third PMOS transistor P23 whose gate and bulk are coupled to the nodes Q22 and Q24 respectively. A second capacitor C22 is coupled between a second clock terminal supplying a clock bar signal φB and the node Q21. Between the nodes Q21 and Q22 is connected a fourth PMOS transistor P24 whose gate and bulk are coupled to the nodes Q22 and Q24 respectively.

Further, transistors N21 and N22 are cross-coupled. Transistors P21 and P23 are cross-coupled, while P22 and P24 are cross-couple. The cross-coupled of the transistor pair is such that a gate of one transistor is connected to a source of the other transistor while a source of the one transistor is connected to a gate of the other transistor. For instance, the gate terminal of the transistor N21 is connected to the source terminal of the transistor N22, while the source terminal of the transistor N21 is connected to the gate terminal of the transistor N22.

As shown in FIG. 2, the first pumping stage is constructed of the MOS transistors N21, N22, P21, P22, P23, and P24, with cross-coupled transistor pairs of N21 and N22, P21 and P23, and P22 and P24. The PMOS transistors, P22 and P24, cut off a current flowing through the bulk terminals of the PMOS transistors P21 and P23 in order to prevent an abnormal conduction of them.

The second and third pumping stages, PS2 and PS3, are constructed in the same circuit pattern with the first pumping stage. That is, the second pumping stage PS2 is constructed of cross-coupled pairs of N23 and N24, P25 and P27, and P26 and P28. The third pumping stage PS3 is constructed of cross-coupled pairs of N25 and N26, P29 and P31, and P30 and P32.

In an operation of the charge pumping circuit shown in FIG. 2, when the clock signal φ or φB goes to HIGH, an initial state is set by the voltages of Vcc at the nodes Q21 and Q22. The voltages at the nodes of the second stage PS2, Q25 and Q26, maintain at Vcc+ΔV, which is identical to the voltage at the node Q23. The voltages at the nodes of the third stage PS3, Q29 and Q30 maintain at Vcc+2ΔV, which is also a voltage at a node Q27 acting as an input terminal for the third stage PS3.

Next, in the first stage PS1, when the clock signal φ is HIGH while φB is a LOW, the voltage at the node Q22 rises up to Vcc+ΔV while the voltage at the node Q21 is held at Vcc. Since the voltage at the node Q21 is lower than the voltage at the node Q22, the PMOS transistors P21 and P22 are turned ON and the NMOS transistor N21 is turned OFF. Also, since the voltage at the node Q22 is higher than Vcc, the NMOS transistor N22 is turned ON. Also, since the voltage at the node Q22 is higher than the voltage at the node Q21, the PMOS transistors P23 and P24 are turned OFF. Thus, the voltage at the node Q21 maintains at Vcc, and the voltage at the node Q22 becomes Vcc+ΔV, since the node Q22 is connected to the node Q23 through the PMOS transistor P21. At this time, the voltage at the node Q24 becomes Vcc+ΔV, since the node Q24 is connected to the node Q22 through the PMOS transistor P22 and the voltages at the bulk of PMOS transistors P21 and P22 maintain at Vcc+ΔV.

In the second stage PS2, when the clock signal φ is a HIGH while φB is a LOW, the voltages at the nodes Q25 and Q26 are Vcc+2ΔV and Vcc+ΔV respectively. As the voltage at the node Q26 maintains at Vcc+ΔV, which is lower than that the voltage at the node Q25, the PMOS transistors P27 and P28 are turned ON while the NMOS transistor N24 is turned OFF.

Also, since the voltage at the node Q25 is higher than that at the node Q23, the NMOS transistor N23 is turned ON. Since the voltage at the node Q25 is higher than that at the node Q26, the PMOS transistors P25 and P26 are turned OFF. Thus, the voltage at the node Q26 maintains at Vcc+ΔV, and the voltage at the node Q25 becomes Vcc+2ΔV, since the node Q25 is connected to the node Q27 through the PMOS transistor P27. At this time, the voltage at the node Q28 becomes Vcc+2ΔV, since the node Q28 is connected to the node Q25 through the turned on PMOS transistor P28, and the voltages at the bulk of PMOS transistors P27 and P28 maintain at Vcc+2ΔV.

In the third stage PS3, when the clock signal φ is HIGH while φB is LOW, the voltages at the nodes Q30 and Q29 are Vcc+3ΔV and Vcc+2ΔV respectively. Since the voltage at the node Q29 is lower than that of Q30, the PMOS transistors P29 and P30 are turned ON while the NMOS transistor N25 is turned OFF.

Also, since the voltage at the node Q30 is higher than Vcc+2ΔV, the NMOS transistor N26 is turned ON. Since the voltage at the node Q30 is higher than that of the node Q29, the PMOS transistors P31 and P32 are turned OFF. Thus, the voltage at the node Q29 maintains at Vcc+2ΔV, and the node Q30 becomes Vcc+3ΔV, since the node Q30 is connected to the node Q31 through the PMOS transistor P29. The voltage at the node Q31 maintains at Vcc+3ΔV and is outputted to the output terminal Vout. At this time, the voltage at the node Q32 becomes Vcc+3ΔV since the node Q32 is connected to the node Q30 through the PMOS transistor P30, and the voltages at the bulk of PMOS transistors P29 and P30 maintain at Vcc+3ΔV.

While the above description about the charge pumping operation is for the time when the clock signal φ is HIGH, the final output voltage Vout of Vcc+3ΔV can also be obtained even when the clock signal φ is LOW, i.e., its complementary clock bar signal φB is HIGH. With reference to the high-leveled clock signal φB, the voltage of Vcc+ΔV is transferred from the first stage PS1 to the second stage PS2 through the PMOS transistor P23 and the voltage of Vcc+2ΔV is transferred to the third stage PS3 from the second stage PS2 through the PMOS transistor P25. And finally, the Vcc+3ΔV is transferred to the output terminal Vout from the third stage through the PMOS transistor P31. As a result, the charge pump circuit of FIG. 2 always generates the Vcc+3ΔV as the output voltage. It should be understood that, either with φ or with φB, there is no voltage drop because the pumped voltages are transferred through the PMOS transistors.

Figure 3:
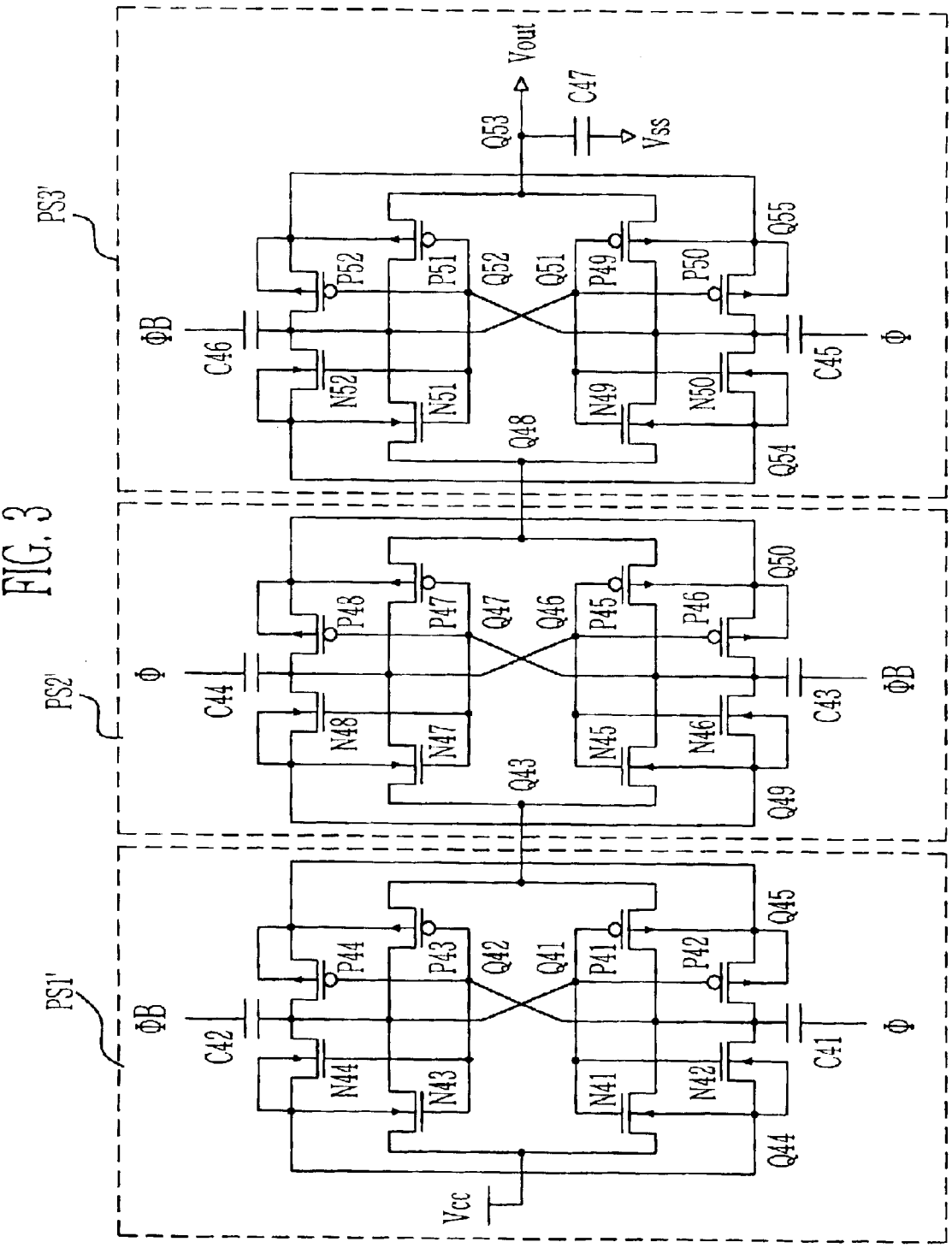
FIG. 3 is a circuit diagram of a charge pump circuit according to another embodiment of the invention.

FIG. 3 shows another example of a charge pump circuit according to the invention, composed of three pumping stages PS1', PS2', and PS3', such as that of FIG. 2.

Referring to FIG. 3, in the first pumping stage PS1', between Vcc and a node Q42 is connected a first NMOS transistor N41 whose gate and bulk are coupled to the node Q41 and a node Q44 respectively. Between the node Q42 and a node Q43 is connected a first PMOS transistor P41 whose gate and bulk are coupled to the node Q41 and a node Q45 respectively. A first capacitor C41 is coupled between a clock terminal and a node Q42. Between the nodes Q42 and Q44 is connected a second NMOS transistor N42 whose gate and bulk are coupled to the node Q41 and the node Q44 respectively. Between the nodes Q42 and Q45 is connected a second PMOS transistor P42 whose gate and bulk are coupled to the nodes Q41 and Q45 respectively.

Between Vcc and the node Q41 is connected a third NMOS transistor N43 whose gate is coupled to the node Q42. Between the nodes Q41 and Q43 is connected a third PMOS transistor P43 whose gate and bulk are coupled to the nodes Q42 and Q45 respectively. A second capacitor C42 is coupled between the complementary clock bar terminal and the node Q41. Between the nodes Q41 and Q44 is connected a fourth NMOS transistor N44 whose gate and bulk are coupled to the node Q42 and Q44 respectively. Between the nodes Q41 and Q45 is connected a fourth PMOS transistor P44 whose gate and bulk are coupled to the nodes Q42 and Q45 respectively.

As shown in FIG. 3, the first pumping stage PS1' is constructed of cross-coupled transistor pairs of N41 and N43, N42 and N44, P41 and P43, and P42 and P44. The NMOS transistors N42 and N44 are to regulate a bulk voltage of the NMOS transistors N41 and N43 those transfer a voltage level thereto from a prior stage. The PMOS transistors, P42 and P44, cut off a current flowing through the bulk of the PMOS transistors P41 and P43 in order to prevent an abnormal conduction of them.

Other pumping stages, PS2' and PS3', are constructed in the same circuit pattern with the first pumping stage PS1'. That is, the second pumping stage PS2' is constructed of cross-coupled pairs of N45 and N47, N46 and N48, P45 and P47, and P46 and P48. The third pumping stage PS3' is constructed of cross-coupled pairs of N49 and N51, N50 and N52, P49 and P51, and P50 and P52.

The charge pump circuit shown in FIG. 3 further includes the NMOS transistors, e.g., N42 and N44, to regulate the bulk voltage of other NMOS transistors, e.g., N41 and N43. The addition of the NMOS transistors overcomes a limit to the number of pumping stages. If the pumping stages approximate more than five, it is hard to transfer a high voltage via the stages due to a body effect of the NMOS transistor. The body effect increases a threshold voltage of the NMOS transistor. Therefore, a desired high voltage cannot be obtained at an output terminal. As shown in FIG. 3, the bulk of the NMOS transistors N41 and N43 is controlled through the bulk of the NMOS transistors N42 and N44, not connected to a ground voltage but to sources of the NMOS transistors N42 and N44, so that the body effect does not more severe in accordance with an increase of the pumping stages.

Figure 1:
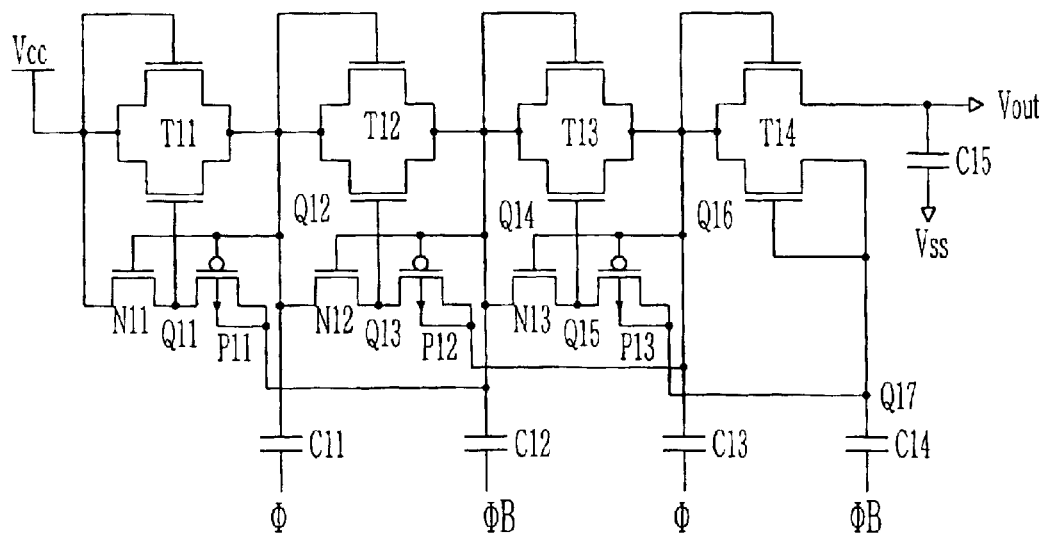
FIG. 1 is a circuit diagram of a conventional charge pump.
Figure 4:
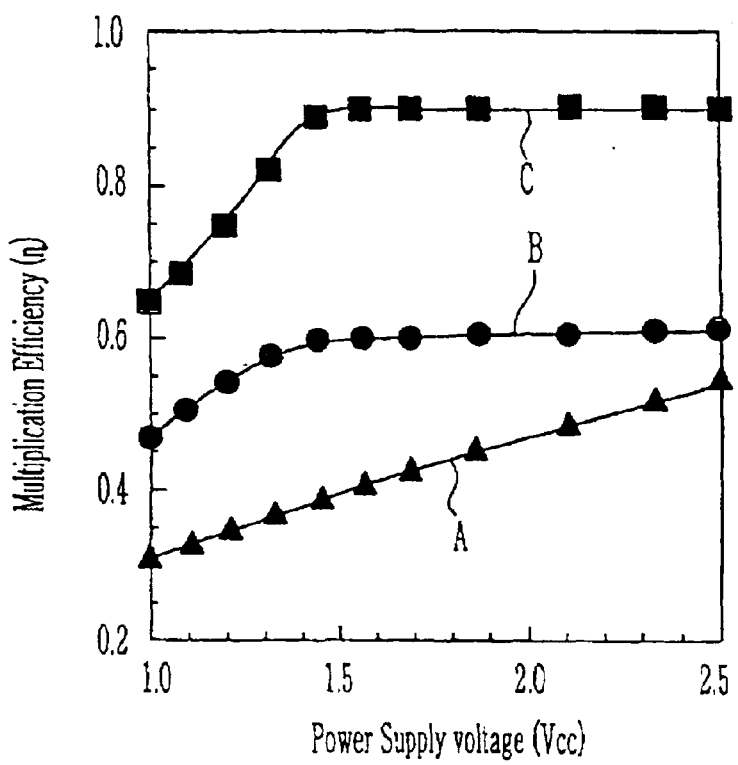
FIG. 4 is a graphic diagram comparing boost characteristics of the charge pump circuit according to the invention with the conventional features.

FIG. 4 graphically illustrates a comparison result about multiplication efficiency of charge pump circuits, the Dickson's of (the curve A), the conventional one shown in FIG. 1 (the curve B), and the present one shown in FIG. 2 (the curve C), by means of HSPICE simulation. In the graph of FIG. 4, it is assumed that each charge pump circuit is composed of four pumping stages. The multiplication efficiencies are along an increase of the power supply voltage Vcc, being obtained by Vout/5Vcc. The 5Vcc is the maximum voltage permitted by the four-stage pumping circuit. It is also assumed that: a loading capacitor ($C_{LOAD}$) coupled between the output terminal Vout and the ground voltage, e.g., C15 or C27, is 100 pF; the pumping capacitor coupled to the clock signal, e.g., C11 or C21, is 20 pF; and a pumping frequency ($F_{PUMP}$) is 10 MHz.

As shown in FIG. 4, the Dickson's curve A is characterized with the lowest multiplication efficiency, which is caused from the fact that voltage drops happen at every pumping stages. The circuit of FIG. 1 has higher multiplication efficiency than that of the Dickson's because it meets to a voltage drop only at the output terminal through the diode-coupled NMOS transistor (i.e., T14). And, it can be seen by the curve C that the circuit of FIG. 2 generates the highest multiplication efficiency. Such an advanced result of the curve C rises from the fact that pumped voltages at the stages are transferred through the PMOS transistors, by which there is no voltage drop for the pumping voltages. Without a voltage loss throughout the serial pumping stages, the charge pump circuit of FIG. 2 can obtain the multiplication efficiency reaching 0.9 even in a lower power supply voltage such as 1.5 V.

Figure 5:
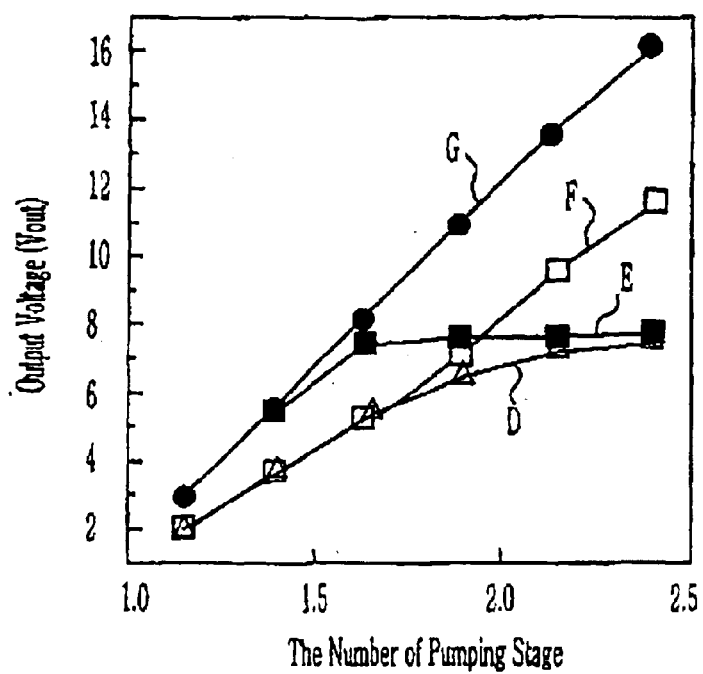
FIG. 5 is a graphic diagram illustrating boost characteristics in accordance with the number of pumping stages in various charge pump circuits.

FIG. 5 shows variable characteristics of an output voltage in accordance with the number of the pumping stages. The curves D, E, F, and G are relevant to the circuit shown in FIG. 1, the circuit shown in FIG. 2, the circuit shown in FIG. 1 in which a voltage level of the clock signal rises up to 2Vcc from Vcc, and the circuit shown in FIG. 3. As shown with the curves D and E, the output voltage does not increase more if the number of pumping stages is over five approximately, i.e., a saturation state if of the output voltage. On the other band, the curves F and C continue to increase along the number of pumping stages. However, the clock signal of 2Vcc (the curve F) is not advantageous to lightening a voltage stress against gate oxide layers of the MOS devices forming the charge transfer switches in FIG. 1. As a result, the charge pumping circuit shown in FIG. 3 generates a higher output voltage than any other types.

As aforementioned, the charge pump circuit of the invention desirably generates a high voltage without causing a voltage stress on gate oxide layers of MOS devices constructing the circuit. In addition, the circuit of the invention enhances the efficiency of transferring pumped voltages without voltage drops. Moreover, the present charge pumping circuit overcomes the limit in the number of pumping stages, being free from a saturation state of an output voltage due to body effects that increases threshold voltages of MOS devices forming the circuit.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A charge pump circuit comprising:
   a first switch for selectively connecting an input terminal to a second pumping node;
   a second switch for selectively connecting the input terminal to a first pumping node;
   a first pumping capacitor for boosting a signal at the second pumping node in response to a first clock signal;
   a second pumping capacitor for boosting a signal at the first pumping node in response to a second clock signal;
   a third switch for selectively connecting the second pumping node to an output terminal;
   a fourth switch for selectively connecting the first pumping node to the output terminal; and
   a fifth switch for regulating the third switch in response to a voltage level of the signal at the first pumping node.

2. The charge pump circuit of claim 1, wherein the first and second clock signals are complementary in phase each other.

3. The charge pump circuit of claim 1, wherein the first switch is a first NMOS transistor driven in response to a voltage level of the signal at the first pumping node, with a drain terminal of the first NMOS transistor being connected to the input terminal, a gate terminal of the first NMOS transistor being connected to the first pumping node, and a source terminal of the first NMOS transistor being connected to the second pumping node.

4. The charge pump circuit of claim 3, further comprising a second NMOS transistor for regulating the first NMOS transistor in response to a voltage level of the signal at the first pumping node, with a source terminal of the second NMOS transistor being connected to a bulk terminal of the first NMOS transistor, a gate terminal of the second NMOS transistor being connected to the first pumping node and a drain terminal of the second NMOS transistor being connected to the second pumping node.

5. The charge pump circuit of claim 1, further comprising a sixth switch for regulating the first switch in response to a voltage level of the signal at the second pumping node.

6. The charge pump circuit of claim 1, wherein the third switch is a first PMOS transistor driven in response to a voltage level of the first pumping node, with a source terminal of the first PMOS transistor being connected to the second pumping node, a gate terminal of the first PMOS transistor being connected to the first pumping node, and a drain terminal of the first PMOS transistor being connected to the output terminal.

7. The charge pump circuit of claim 6, wherein the fifth switch is a second PMOS transistor for regulating the first PMOS transistor in response to a voltage level of the signal at the first pumping node, with a drain terminal of the second PMOS transistor being connected to a bulk terminal of the first PMOS transistor, a gate terminal of the second PMOS transistor being connected to the first pumping node and a source terminal of the second PMOS transistor being connected to the second pumping node.

8. The charge pump circuit of claim 1, wherein the second switch is a first NMOS transistor driven in response to a voltage level of the second pumping node, with a drain terminal of the first NMOS transistor being connected to the input terminal, a gate terminal of the first NMOS transistor being connected to the second pumping node, and a source terminal of the first NMOS transistor being connected to the first pumping node.

9. The charge pump circuit of claim 8, further comprising a second NMOS transistor for regulating the first NMOS transistor in response to the voltage level of the second pumping node, with a source terminal of the second NMOS transistor being connected to a bulk terminal of the first NMOS transistor, a gate terminal of the second NMOS transistor being connected to the second pumping node, and a drain terminal of the second NMOS transistor being connected to the first pumping node.

10. The charge pump circuit of claim 1, further comprising a sixth switch for regulating the second switch in response to a voltage level of the signal at the second pumping node.

11. The charge pump circuit of claim 1, wherein the fourth switch is a first PMOS transistor driven in response to a voltage level of the signal at the second pumping node, with a source terminal of the first PMOS transistor being connected to the first pumping node, a gate terminal of the first PMOS transistor being connected to the second pumping node, and a drain terminal of the first PMOS transistor being connected to the output terminal.

12. The charge pump circuit of claim 11, further comprising a second PMOS transistor for regulating the first PMOS transistor in response to the voltage level of the signal at the second pumping node, with a drain terminal of the second PMOS transistor being connected to a bulk terminal of the first PMOS transistor, a gate terminal of the second PMOS transistor being connected to the second pumping node and a source terminal of the second PMOS transistor being connected to the first pumping node.

13. The charge pump circuit of claim 1, further comprising a sixth switch for regulating the fourth switch in response to a voltage level of the signal at the first pumping node.

14. A charge pump circuit comprising:
   a first NMOS transistor having a drain terminal connected to an input terminal, a gate terminal connected to a first pumping node and a source terminal connected to a second pumping node;
   a second NMOS transistor having a drain terminal connected to the input terminal, a gate terminal connected to the second pumping node and a source terminal connected to the first pumping node;
   a first PMOS transistor having a source terminal connected to the second pumping node, a gate terminal connected to the first pumping node and a drain terminal connected to an output terminal;
   a second PMOS transistor having a source terminal connected to the first pumping node, a gate terminal connected to the second pumping node and a drain terminal connected to the output terminal;
   a third PMOS transistor having a source terminal connected to the second pumping node, a gate terminal connected to the first pumping node and a drain terminal connected to a bulk terminal of the first PMOS transistor;
   a fourth PMOS transistor having a source terminal connected to the first pumping node, a gate terminal connected to the second pumping node and a drain terminal connected to a bulk terminal of the second PMOS transistor;

a first pumping capacitor for boosting a signal at the second pumping node in response to a first clock signal; and a second pumping capacitor for boosting a signal at the first pumping node in response to a second clock signal, wherein the first and second clock signals being complementary in phase each other, and wherein the second NMOS transistor, and the second and fourth PMOS transistors are driven in response to a voltage level of the first pumping node while the first NMOS transistor, and the first and third PMOS transistors are driven in response to a voltage level of the second pumping node.

15. A charge pump circuit comprising:

a first NMOS transistor having a drain terminal connected to an input terminal, a gate terminal connected to a first pumping node and a source terminal connected to a second pumping node;

a second NMOS transistor having a drain terminal connected to the input terminal, a gate terminal connected to the second pumping node and a source terminal connected to the first pumping node;

a third NMOS transistor having a source terminal connected to a bulk terminal of the first NMOS transistor, a gate terminal connected to the first pumping node and a drain terminal connected to the second pumping node;

a fourth NMOS transistor having a source terminal connected to a bulk terminal of the second NMOS transistor, a gate terminal connected to the second pumping node and a drain terminal connected to the first pumping node;

a first PMOS transistor having a source terminal connected to the second pumping node, a gate terminal connected to the first pumping node and a drain terminal connected to an output terminal;

a second PMOS transistor having a source terminal connected to the first pumping node, a gate terminal connected to the second pumping node and a drain terminal connected to the output terminal;

a third PMOS transistor having a source terminal connected to the second pumping node, a gate terminal connected to the first pumping node and a drain terminal connected to a bulk terminal of the first PMOS transistor;

a fourth PMOS transistor having a source terminal connected to the first pumping node, a gate terminal connected to the second pumping node and a drain terminal connected to a bulk terminal of the second PMOS transistor;

a first pumping capacitor for boosting a signal at the second pumping node in response to a first clock signal; and a second pumping capacitor for boosting a signal at the first pumping node in response to a second clock signal, wherein the first and second clock signals being complementary in phase each other, and wherein the second and fourth NMOS transistors, and the second and fourth PMOS transistors are driven in response to a voltage level of the second pumping node while the first and third NMOS transistors, and the first and third PMOS transistors are driven in response to a voltage level of the first pumping node.

\* \* \* \* \*